US007773761B2

(12) United States Patent
Sun et al.

(10) Patent No.: US 7,773,761 B2

(45) Date of Patent: Aug. 10, 2010

(54) METHOD AND APPARATUS TO GENERATE AN AUDIO BEAM WITH HIGH QUALITY

(75) Inventors: Xiaobing Sun, Singapore (SG); Kanzo Okada, Singapore (SG)

(73) Assignee: Sony Corporation, Tokyo (JP)

( * ) Notice: Subject to any disclaimer, the term of this patent is extended or adjusted under 35 U.S.C. 154(b) by 1367 days.

(21) Appl. No.: 11/099,137

(22) Filed: Apr. 5, 2005

(65) Prior Publication Data

US 2005/0220311 A1 Oct. 6, 2005

(30) Foreign Application Priority Data

Apr. 6, 2004 (SG) ............................ 200401920-4

(51) Int. Cl.
*H04B 3/00* (2006.01)
*H04R 27/00* (2006.01)
*H04R 3/00* (2006.01)

(52) U.S. Cl. ........................... 381/77; 381/82; 381/111

(58) Field of Classification Search .................. 381/77, 381/82, 79, 111, 2; 455/46
See application file for complete search history.

(56) References Cited

U.S. PATENT DOCUMENTS 6,052,336 A 4/2000 Lowrey, III
7,146,011 B2 * 12/2006 Yang et al. .................... 381/77
2002/0146138 A1 * 10/2002 Kolano et al. ................. 381/77

FOREIGN PATENT DOCUMENTS

| | | |
|---|---|---|
| EP | 0 973 152 | 1/2000 |
| WO | WO 98 02976 | 1/1998 |
| WO | WO 98 49868 | 11/1998 |
| WO | WO 01 08449 | 2/2001 |
| WO | WO 03 019125 | 3/2003 |

OTHER PUBLICATIONS

Aoki K et al: "A Parametric Loudspeaker Applied Examples" Electronics & Communications in Japan, Part 111—Fundamental Electric Science, Scripta Technica. New York, US, vol. 77, No. 1, Jan. 1994, pp. 64-73, XP000468606 ISSN: 1042-0967.

* cited by examiner

*Primary Examiner*—Vivian Chin
*Assistant Examiner*—Douglas J Suthers
(74) *Attorney, Agent, or Firm*—Frommer Lawrence & Haug LLP; William S. Frommer; Thomas F. Presson

(57) ABSTRACT

The present invention proposes a system in which an ultrasonic carrier beam is modulated using an audio input signal. The audio signal is divided into frequency bands, and that frequencies in different ones of these bands are treated differently. Specifically, different modulating schemes are used for different frequency bands. Also, different transducer aperture sizes are used for different frequency signals. Also, a further frequency equalizer is provided within each of the frequency bands. Finally, a relatively smaller amplitude modulating index (or indices) is used for signals in low frequency band(s).

18 Claims, 4 Drawing Sheets

METHOD AND APPARATUS TO GENERATE AN AUDIO BEAM WITH HIGH QUALITY

FIELD OF THE INVENTION

The present invention relates to methods and apparatus for modifying an ultrasonic signal such that, when transmitted through a transducer, it generates an ultrasonic beam modulated with an audio signal, so that the audio signal is reproduced in air.

BACKGROUND OF THE INVENTION

The acoustic field generated by conventional loudspeaker is not directional especially for low frequency signals. Directional radiation at medium and low frequencies is only possible by using an array of loudspeakers having complex control mechanisms, and the resulting system has a high cost.

However, it is well known that a highly directional ultrasonic beam can be generated relatively easily. It is further known to modulate an ultrasonic wave such that it contains two ultrasonic frequency components differing by an audio frequency, and transmit the modulated ultrasonic wave into air as a narrow beam. Nonlinear effects of the air cause the two component signals to interact and a new signal with a frequency corresponding to the difference of the two frequencies is generated. Thus, the nonlinear effects of air will automatically demodulate the ultrasonic signal and reproduce the audio signal in a narrow region of air [1]-[5]. This highly directional audio space is called an audio beam.

This is a very promising technology with a very wide range of possible applications. However, because the demodulating process is nonlinear, the reproduced audio signal is highly distorted unless there is appropriate pre-processing. Several kinds of pre-processing are suggested [4], [6], [8] and [9].

The overall structure of these systems is shown in FIG. 1. An audio signal is input from the left of the figure to a pre-processing unit 1. The output of the pre-processing unit 1 is transmitted to a modulation and power amplification unit 2, as is an ultrasonic wave generated by an oscillator 3. The modulation and power amplification unit 2 uses the output of the pre-processing unit 1 to modulate the ultrasonic wave, and the resultant ultrasonic wave is transmitted to an ultrasonic transducer 4, which generates a directional ultrasonic beam 5, which is demodulated by air to regenerate the audio sound.

Such a system typically suffers from two forms of distortion. Firstly, the frequency response is not uniform. In particular there is a −12 dB/octave decrease in sound pressure level (SPL) toward the low frequency end. Secondly, the demodulating process will generate many (distortion) frequency components that are not included in the original audio signal. For simplicity, we refer to these extra signals in this document as total harmonic distortion (THD) (although this is not the exact definition of THD used in acoustics). The pre-processing methods so far suggested attempt to overcome mainly the second problem. However, they are neither efficient nor easy to implement in practice.

To explain why this is so, we turn to a mathematical discussion of the situation. Based on the nonlinear theory of acoustics, it is shown in [5] that if two collimated primary waves with frequencies $f_1$ and $f_2$ respectively are transmitted from a piston radiator, due to the non-linearity of the air, the reproduced difference frequency signal (secondary wave) is:

$$q_-(r,z) = -\frac{j p_{0a} p_{0b} \beta k_-^2 a^2}{4\rho_0 c_0^2 \alpha_T} \frac{e^{-\alpha_- z}}{z} D_W(\theta) D_A(\theta) \exp\left(-\frac{1}{2} j k_- z \tan^2\theta\right), \quad (1)$$

where q_(r, z) is the complex-valued amplitude of the difference frequency signal, z is the coordinate along the axis of the beam, r is the transverse coordinate, $p_{0a}$ and $p_{0b}$ are the initial SPLs of the two primary frequency waves of a piston radiator with radius a, k_ is the wave number of difference frequency $f_1-f_2$ (assuming $f_1>f_2$), β is the coefficient of nonlinearity, $\rho_0$ is the ambient density of the medium, $c_0$ is the small-signal wave propagation speed, $$D_W(\theta) = \frac{1}{1 + j(\kappa_- / 2\alpha_T)\tan^2\theta}$$

It has been further shown by Berktay that under certain simplifying assumptions [5], if a DSB AM primary wave $p_1(t)$ is transmitted, after the air demodulation, at the far field of the transducer and on the z axis of the beam, a secondary wave $p_2(t)$ will be generated:

$$p_1(t)=P_0 E(t)\sin(\omega_c t) \quad (2)$$

$$p_2(t) = \frac{\beta P_0^2 A}{16\pi\rho_0 c_0^4 z\alpha} \frac{\partial^2}{\partial\tau^2} E^2(\tau) \quad (3)$$

where $P_0$ is the SPL of primary wave, E(t) is the modulation envelope, $\omega_c$ is the angular frequency of carrier wave, A is the transducer's cross sectional area, α is the absorption coefficient of the medium (at $\omega_c$), and $\tau=t-z/c_0$ is the lag time. The relationship between the modulation envelope E(t) and the audio signal a(t) is:

$$E(t)=1+ma(t) \quad (4)$$

where m is the AM index. Based on Eqn. (3), it is found that the demodulated signal is not linearly proportional to the envelope of the modulation. To reproduce the audio signal with high fidelity, an equalization of the audio signal a(t) is required to compensate the square operation on E(t). This means that by appropriately pre-processing a(t) before AM, the secondary wave should be directly proportional to a(t). This can be achieved by generating a modified version $\tilde{E}(t)$ of E(t) as [4], [6]:

$$\tilde{E}(t) = \left[1 + m\int\int a(t)dt^2\right]^{1/2} \quad (5)$$

This seemingly simple pre-processing is very difficult to implement in practice. The main difficult arises from the square-root operation. Because it is a nonlinear operation, it will increase the signal bandwidth vastly. This poses a very strict requirement to the bandwidth of the circuit and ultrasonic transducer. Especially for ultrasonic transducer, it is very difficult to make a wideband and high power-efficiency transducer. The double integration is also difficult to implement due to the −12 dB/octave amplitude weighting effect and also to the large frequency span (20~20,000 Hz, 10 octaves) of audio signal. Also, analog integrator is easy to saturate and difficult to debug in practice.

In summary, the simple square-root pre-processing used to compensate the distortion will not work well in practice because of the following reasons: 1) a practical transducer has a limited bandwidth which is usually not enough to transmit all the frequency components required by square-root operation, especially for high audio frequency (e.g. f>5 kHz). 2) the practical transducer frequency response is not uniform even within its pass band. This will result in the harmonic components of one single tone signal being generated with an amplitude and phase different from those required by the square-root operation. 3) a wideband transducer generally has low efficiency compared with a narrow band one since it does not work near the resonant frequency point. 4) the Berktay formula (3) is only an approximation that is valid under far-field and on-axis conditions, while some of the interesting working areas in practice are within the near field and off-axis, and 5) in practice, if the modulating part of the signal is small, the square rooted waveform $\tilde{E}(t)$ is very similar to the waveform without the square-root operation E(t). Thus, the effect of square-root operation is actually not so evident as it seems to be.

To reduce the THD of multiple frequency signals while in the same time to avoid the wideband requirement of the square-root pre-processing method, [8] and [9] proposed a way to use an iterative process to approximate the square-root envelope by SSB modulation. This is still based on the idea that a square-rooted envelope will generate lower THD. While true square-root DSB AM will require a very large bandwidth, the SSB AM based approximation will avoid such requirement. However, since the real feedback of the demodulated signal is not available, a model is used there to simulate the demodulating process in the air. What is suggested for the model is still based on Berktay's equation (3). However, as noted, (3) is only valid under certain conditions and cannot be used as a general description of the secondary wave field. The real performance of the method is doubtful. Also, the iterative process is complex and requires a large amount of computation. Thus, it is not suitable for real time implementation.

Both of the above two methods are in somewhat similar to the active noise cancellation technique in a large open space. They all add to the original signal with extra frequency components in advance. If the phase and amplitude of these extra components can be accurately controlled, they will cancel the other extra components generated later during the demodulating process. Good matches in both amplitude and phase among these components are needed. In practice, due to the non-uniform response of the circuit and transducer, it is very difficult to implement them over a wide frequency range.

SUMMARY OF THE INVENTION

This invention proposes new and useful ways to reduce the THD and equalize the frequency response.

In general terms the present invention proposes that an input audio signal is divided into frequency bands (that is, it is partitioned into frequency ranges), and that frequencies in different ones of these bands are treated differently in modulating the ultrasonic carrier. This concept has various aspects.

A first aspect of the invention proposes that different modulating schemes are used for different frequency bands.

A second aspect of the invention proposes in general terms that different transducer aperture sizes are used for ultrasonic signals derived from different frequency ranges of the input audio signal. A wide aperture may be used for ultrasonic signals obtained using the lowest audio frequency signals, and a relatively narrower aperture for ultrasonic signals obtained using relatively higher frequency signals.

The second aspect of the invention makes it possible to compensate for an effect of air demodulation discussed in detail below: that there is a −12 dB/octave fall in SPL for low audio frequencies.

Preferably, the ultrasonic carrier frequency also is broadcast through the widest aperture (or at least through a wider aperture than the ultrasonic signal derived using the high frequency audio signals). This effectively means that the equivalent modulating index for the high frequency bands is lower than it would be if the high frequency bands were transmitted using the full aperture size. Note that a small modulating index reduces the THD. As for the low frequency band, a relatively smaller amplitude modulating index may be used obtained by explicitly using a lower modulation index for signals in a low frequency band (or respective low frequency bands) than signals in the high frequency bands.

This leads to a third aspect of the invention, which is that different amplitude modulating indices are used for signals in different frequency bands. A relatively smaller amplitude modulating index (or a plurality of indices) is used for signals in a low frequency band (or respective low frequency bands).

While reducing the amplitude modulating index reduces the THD, it also reduces the SPL. Thus, a careful balance is required between reproducing efficiency and THD.

A fourth aspect of the invention proposes in general terms that a further frequency equalizer is applied within each of the frequency bands, to modify the relative amplitudes of at least some of the audio frequency components within the band such that in the demodulated audio beam the relative amplitudes of those audio frequency components are closer to their relative amplitudes in the input audio signal.

The four aspects of the invention can be straightforwardly combined (in any combination), as described below. Conveniently, the bands used in the four techniques are the same (e.g. the audio signal can be divided into a plurality of frequency bands, and those bands may be modulated onto the carrier signal with different respective modulation techniques, and be transmitted using different respective apertures). However, the invention is not limited in this respect. Rather, the entire audio frequency band may be partitioned in different stages of the modulation and transmission process in different respective ways, such that the two or more of the aspects of the invention may be utilized in respect of different respective partitionings of the audio band.

BRIEF DESCRIPTION OF THE DRAWINGS

An embodiment of the invention will now be described, for the sake of example only, with reference to the following drawings, in which.

DETAILED DESCRIPTION OF THE EMBODIMENTS

Figure 2:
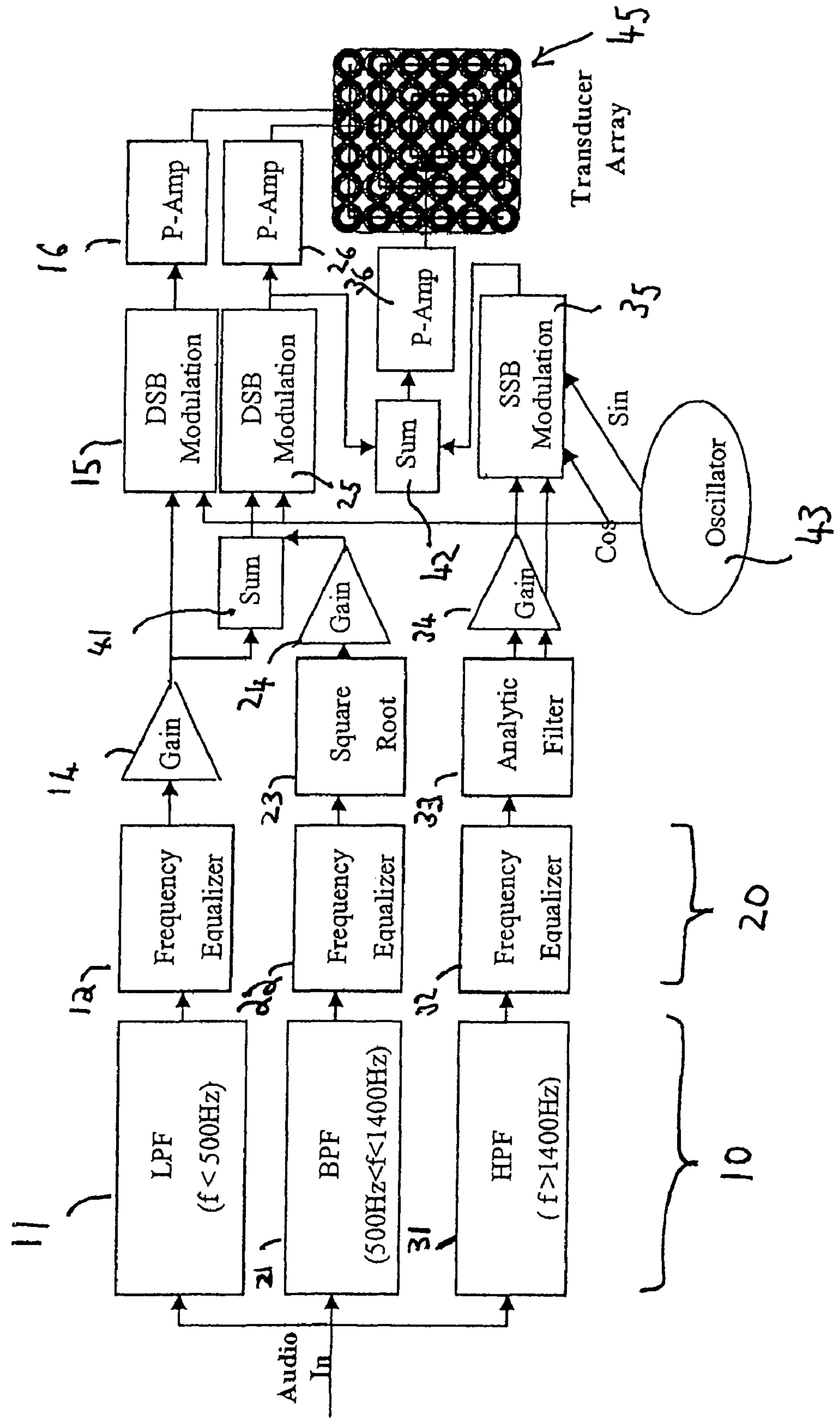
FIG. 2 is the block diagram of the structure of an embodiment of the present invention.

Referring to FIG. 2, an embodiment of the invention is illustrated. The processing illustrated in this figure may be implemented within the scope of the invention by either of analogue or digital processing (or any combination of the two). The following description is an example only, and in no way limits the coverage of the patent.

An audio signal is input to the embodiment from the left of the figure, and input to a filter group 10 having three filters 11, 21, 31, which respectively pass three bands (frequency ranges) of the audio signal: (1) "low band", f<500 Hz, in filter 11; 2) "middle band", 500 Hz<f<1400 Hz, in filter 21; and (3) "high band", f>1400 Hz, in filter 31. Of course, the frequencies which form the divisions between the bands may differ in other embodiments of the invention.

Within each band, the different frequency signals are equalized (it should be understood that the term "equalization" refers here to equalization of the amplitude components in the audio-frequency sound generated from the modulated ultrasonic carrier following the demodulation) by a frequency equalization section 20. The frequency equalization section has three frequency equalizers 12, 22, 23 which operate independently to equalize the frequencies in the three respective frequency bands by multiplying each of the frequency components by a corresponding weight function. An example of the weight function is discussed below in relation to FIG. 4.

The output of the frequency equalizer 12 is passed to a gain adjust unit 14.

The output of the equalizer 22 (for the middle band signal) passes to a square root unit 23 which performs a square root operation. To do the square-root operation, a DC bias is added to make the summed signal always positive so that the square-root operation can be done correctly. The output of this is passed to a gain adjust unit 24.

The output signal of the high band equalizer 32 is further processed by an analytic filter 33, which generates a single sideband (SSB) signal. The SSB signal is complex (with real and imaginary parts, corresponding to in-phase and quadrature-phase components). One example of the implementation of the analytic filter is a Hilbert filter to generate 90-deg shift of the original signal. The output of the analytic filter 33 is further adjusted by a gain adjust unit 34.

The low band signal passes from the gain adjust unit 14 to a DSB modulation unit 15 where it is used to modulate an ultrasonic signal generated by an local oscillator (LO) 43 with the desired frequency $f_c$ (e.g. 40 KHz). This should be at the center frequency of the PZT transducer 45 (described below). The local oscillator 43 also generates a 90° shifted version of the carrier signal.

The DSB modulation unit 15 modulates the ultrasonic signal by simple double sideband (DSB) amplitude modulation (AM). The output signal of the modulation unit 15 is goes to a power amplifier 16, and is used to drive the edge cells of a PZT transducer array 45, as described below with reference to FIG. 5 where this is referred to as "sub-array III".

The output signals of the gain adjusters 14, 24 of both the low band and middle band are summed together by unit 41 and used by a DSB modulation unit 25 to modulate the ultrasonic signal generated by the oscillator 43 by DSB-AM. The output of the DSB modulation unit 25 signal is transmitted through a power amplifier 26 to drive the next to edge (middle part) cells of the PZT array 45 ("sub-array II in FIG. 5).

The high band complex signal output by the unit 34 is used by an SSB modulation unit 35 to modulate the cos and sin components of the ultrasonic signal output by the oscillator 43. The SSB modulation unit 35 operates by single sideband (SSB) AM. This real part (I) and imaginary part (Q) of the signal are multiplied by the carrier signal and its 90° shifted version respectively and added together after multiplication.

The output of the SSB modulation unit 35 is summed by the unit 42 with the output of the DSB modulation unit 25, which (as mentioned above) includes components from both the low and middle band DSB-AM signal. The summed signal output from the unit 42 goes through a power amplifier 36 to drive the center part cells of the PZT array 45 ("sub-array I" in FIG. 5).

Since the low band signal is included in the output of all three power amplifier units 16, 26, 36, it is generated from the whole PZT array and thus results in the largest effective aperture size of transmitting transducer. By contrast, the middle band signal just goes through both the center and next to edges cells of the transducer array and thus will be generated from an effective aperture size lower than that of the low band signal (a medium aperture size). In the same way, the high band signal only goes through the center cells of the transducer array and thus has the smallest effective aperture size. Thus, frequency-dependent aperture sizes are dynamically implemented according to the frequency contents of a real audio signal.

In the above process, the carrier signal is always transmitted through the whole array aperture independent of the frequency content of the input audio signal, since the carrier is present in the outputs of all three of the modulation units 15, 25, 35. This is equivalent to saying that for the middle band and high band signals the AM index (m of Eqn. (4)) is low. By contrast, the effective value of the AM index is higher for the low frequency band, since the low frequency band component of the original audio signal is output through all the power units 16, 26, 36. To make up for this, a relative smaller AM index should be used for the low frequency band to further reduce the THD.

Note that since the input audio signal is divided into several bands, within each band the signal's dynamic range can be reduced, leading to easy circuit implementation Also, the AM index of each band will be separately controlled.

Figure 1:
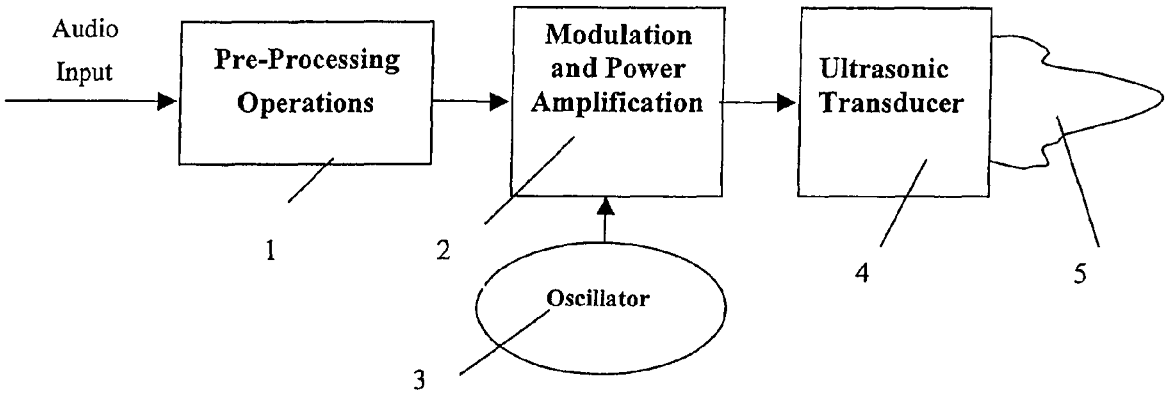
FIG. 1 is a schematic representation of a conventional directional audio signal generating system.

We now turn to a discussion of why the embodiment of FIG. 2 is advantageous compared to the known system of FIG. 1.

Firstly, to explain the advantages of the different modulation units for the different respective frequency bands, it is necessary to compare the advantages of different types of modulations. To simplify the description, we use the case of a single tone for illustration purpose. The real audio signal can be viewed as a sum of many such single tone signals. The basic classes of the modulations include amplitude modulation AM (as used by the embodiment in FIG. 2), frequency modulation (FM) and phase modulation (PM). Among all these classes, AM has the simplest spectrum distribution, i.e. it has the least number of frequency components for a single tone signal. FM and PM will have more frequency components even for a single tone and these components may generate undesirable harmonics between any pairs of them. Thus, in general, AM may be the best class of modulation for audio beam application.

Figure 3:
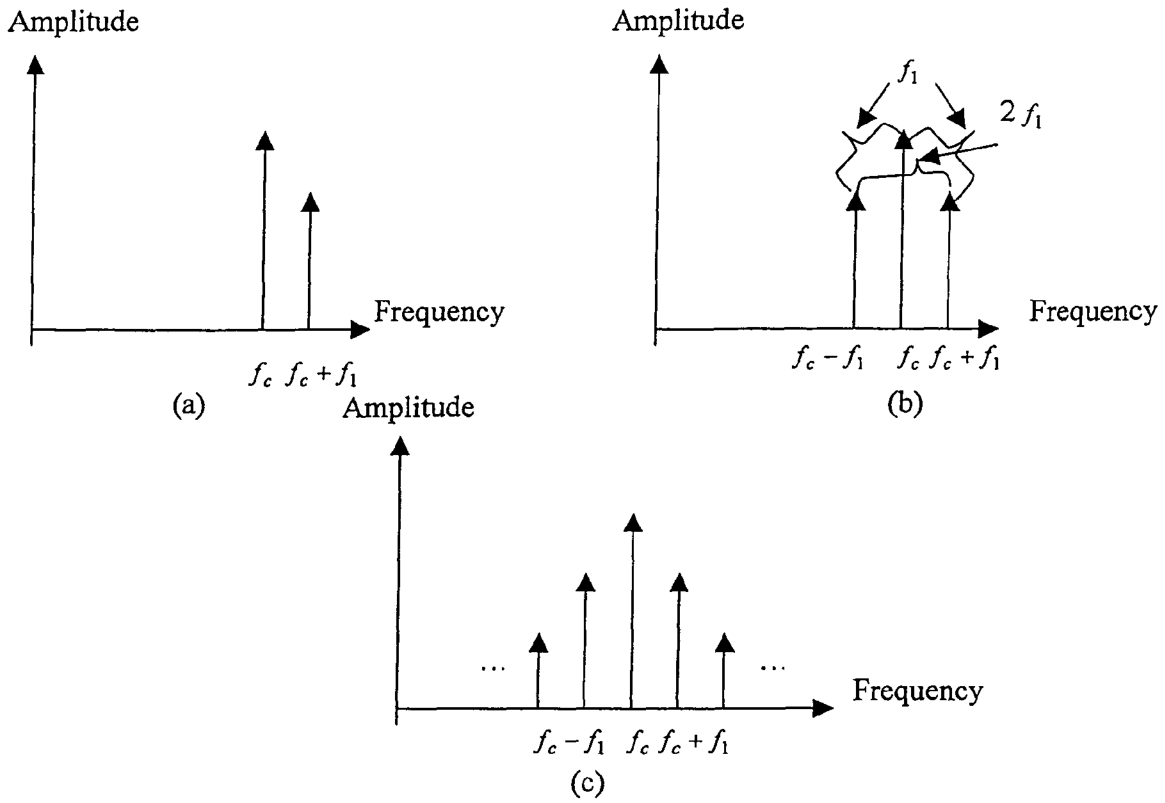
FIG. 3, which is composed of FIG. 3(*a*) to 3(*c*), illustrates the spectrum of a single tone for different AM modulations: (a) SSB AM; (b) DSB AM; (c) Square-root DSB AM.

Among the various known types of AM modulation, different modulating schemes such as SSB, DSB and square-root DSB are now compared. If a single tone with frequency $f_1$ is input into an audio beam system, it is most desirable that only this single tone will be reproduced in air. The AM modulating process will however generate additional frequency components. Based on the modulation theory, SSB AM is the most suitable modulation since it only has two frequency components. One is the carrier frequency $f_c$, and the another is the frequency $f_c+f_1$ (or $f_c-f_1$ depending on which sideband is selected). It is shown in FIG. 3(*a*). In theory, based on Eqn. (1), only the difference frequency $f_1$ will be reproduced. However, it is found in practice that other harmonic frequencies of $f_1$ also exist in the air. The harmonics become more evident for low frequency tones. The reason for generating these harmonics is not clear in theory. It is possibly due to the imperfect performance of the circuit and transducer. Anyway, in practice, SSB AM is not always necessarily the best modulation scheme even for pure single tone signal.

The spectrum of DSB AM of a single tone is shown as in FIG. 3(*b*). There are 3 spectrum lines corresponding to $f_c-f_1$, $f_c$ and $f_c+f_1$. Based on Eqn. (1), the interaction between $f_c-f_1$ and $f_c$, together with the interaction between $f_c$ and $f_c+f_1$, will generate the desired frequency component at $f_1$. However, the interaction between $f_c-f_1$ and $f_c+f_1$ will generate a frequency component at $2f_1$. This is a harmonic distortion. In practical experiment, although it is found that the THD of DSB AM is higher for middle-to-high frequency signal components, the THD is the lowest for low frequency signal. For example, in one implementation using a PZT array, we found that DSB AM has the lowest THD for f<500 Hz under the same SPL conditions.

The square-root DSB AM has the most complex spectrum lines distribution as shown in FIG. 3(*c*). According to theory based on Eqn. (3), the square-root DSB AM will perfectly recovery the envelop signal. The principle is that although multiple frequency lines exist, they will compensate with each other and only the desired frequency $f_1$ will be left in air. In practice, we have found that for the middle frequency band, under the same SPL conditions, this modulation scheme results in the lowest THD. However, for both the low and high frequency bands, it is not the best one. It may also be due to the imperfect performance of the circuit and transducer. One example of the middle frequency band is 500 Hz<f<1400 Hz.

In summary, both from our experimental findings and our theoretical analysis, we have found that the best way to reduce the THD is to use all 3 kinds of AM selectively. For different frequency bands, the modulation scheme with the lowest THD among these 3 schemes should be selected, and one example of such combination is shown in the embodiment of FIG. 2. For frequency f<500 Hz, DSB AM will be used. For 500 HZ<f<1400 Hz, square-root DSB AM will be used. For f>1400 Hz, SSB AM will be used.

One immediate advantage of this combination can be stated as follows: since SSB AM is used for high frequency band modulation, the required bandwidth for the system need be no more than the bandwidth of the audio signal itself.

Note that although FIG. 2 presents one way in which different modulation techniques are used for the different bands, this can be done is many ways in other embodiments of the invention. For example, different modulation techniques may be preferable if the number of frequency bands is different, or if the frequency values which form the transitions between the bands are selected differently. For other embodiments of the invention, these frequency bands and corresponding modulation schemes can be found by experiment.

Secondly, we turn to the feature of the embodiment that the aperture size of the transducer is different for different frequency bands. This is motivated by another big problem of air demodulation: that there is a −12 dB/octave fall in SPL of the frequency response toward low frequency end. This can be seen from either of Eqns. (1) and (3), where it arises from the terms $$k_-^2 = \left(\frac{2\pi}{\lambda_-}\right)^2 \text{ and } \frac{\partial^2}{\partial t^2}$$

respectively.

It has been found by experiment that this effect is evident only for f<1~2 kHz [3]. Even so, the SPL for the low frequency band is still much too low compared with that of the middle-to-high frequency band. To compensate for this effect, one simple way would be to increase the amplitude toward the low frequency band by 12 dB/octave. However, this will means that components of very high amplitude are generated for low frequency audio components while very low amplitude components are generated for high frequency audio components. Any practical system will have a maximum allowed amplitude and, due to the large dynamic range of real audio signals, the efficiency of the response of such a system to high frequency components will be very low.

By contrast, the embodiment of FIG. 2 employs a better way to compensate for the above effect. This is motivated by the observation that in Eqn. (1) the SPL is proportional to the square of the transducer aperture radius $a^2$. Thus, if for the low frequency band, a bigger aperture radius is used, the SPL will be increased efficiently. This is what we call here a "dynamic aperture" since the effective aperture size changes according to the frequency content of the audio signal.

Figure 5:
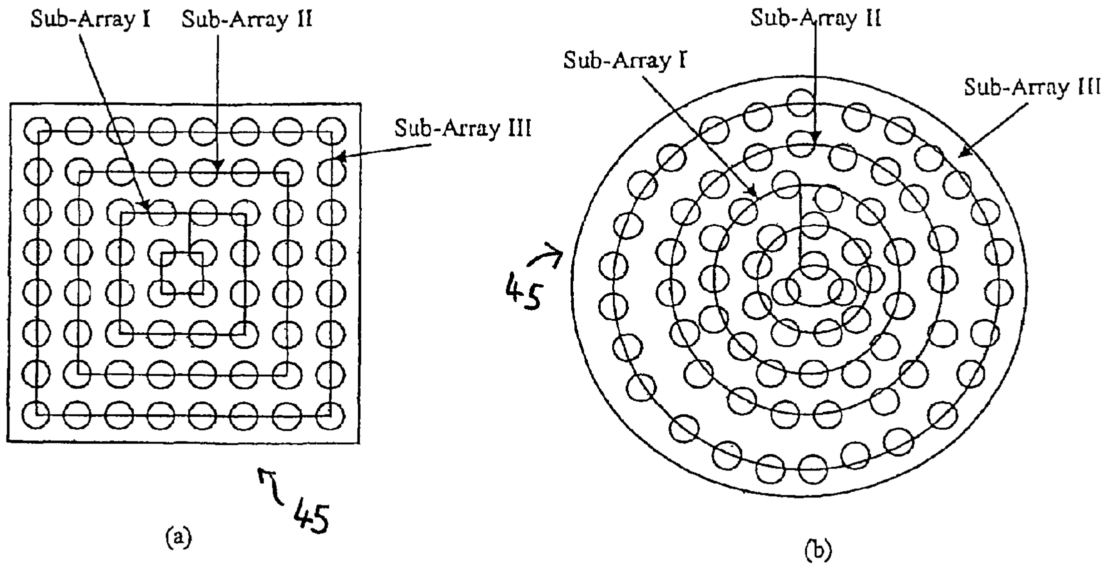
FIG. 5, which is composed of FIGS. 5(*a*) and 5(*b*), shows how the embodiment of FIG. 2 implements the concept of changing of the aperture size for different frequency bands.

In principle, this could be implemented by feeding modulated carrier signals generated by the respective audio frequency bands to different transducers of different apertures. However, more conveniently, the embodiment of FIG. 2 employs a cell-based transducer array 45 such as PZT array. Two possible forms of this PZT array are illustrated in FIGS. 5(*a*) and 5(*b*) respectively. Each is composed of three nested sub-arrays of different respective diameters (the diameter of each sub-array may be defined as the maximum distance between two PZT elements included in the sub-array), which constitute respective sub-apertures. As explained in FIG. 2, the sub-arrays are powered by signals generated respectively by the power amplifiers 16, 26, 36, which receive signals within different selections from the three frequency band signals. In the embodiment of FIG. 2 the three frequency bands are the three frequency bands which were subject to the different respective frequency dependent modulation scheme stated above, i.e. for f<500 Hz, the whole aperture is used, for 500 HZ<f<1400 Hz, a middle size aperture is used while for f>1400 Hz the smallest aperture is used. In other embodiments, the sub-arrays may be driven by signals derived based on frequency bands which are different from the bands which determined the modulation of the signals.

The dynamic aperture of the embodiment of FIG. 2 can efficiently compensate the SPL fall toward the low frequency band in a coarse way, i.e., it will increase the SPL of all frequency components within each frequency band. However, different frequency components within the same band will still be transmitted using the same aperture size, so even if all frequencies are present with equal amplitude in the input signal, the SPL will still be non-flat. To make the frequency response more uniform, the embodiment of FIG. 2 uses the frequency equalization stage 20. Within each band, the respective frequency equalizers 12, 22, 32 effectively multiply the amplitudes of the frequency components by respective weighting functions. The weighting function is higher for the low frequencies, and correspondingly lower for the high frequency components within each band. Preferably the weighting function varies continuously with the frequency value. The variation of the weighting value is dependent on the frequency range (measured in octave) of each sub-band.

Figure 4:
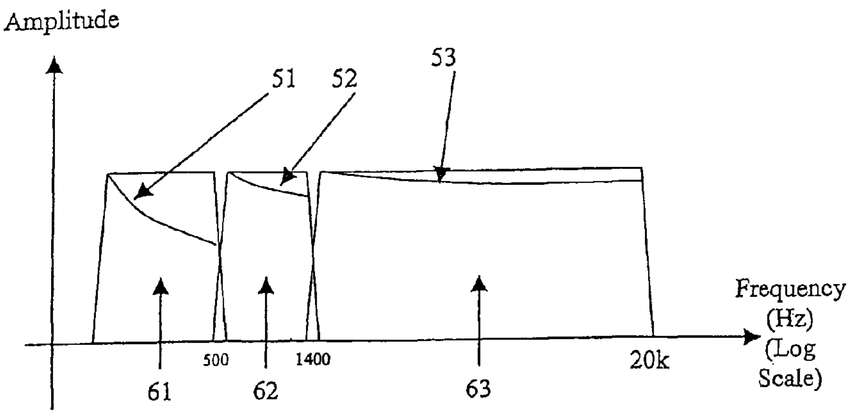
FIG. 4 is an example of the frequency band separation and their internal band frequency equalizing values, as implemented by the embodiment of FIG. 2.

The frequency equalization is illustrated in FIG. 4. The three frequency bands are labeled 61 (the low frequency band which is modulated using DSB AM), 62 (the middle frequency band which is modulated using square-root DSB AM) and 63 (the high frequency band which is modulated using SSB AM). The values of the weighting function of each band are illustrated by lines 51, 52, 53, and the frequency equalization units 12, 22, 32 accordingly multiply the frequency components by weight values which are the values 51, 52, 53, to obtain a substantially flat response in the resulting signal.

An advantage of the above suggested frequency division based pre-processing scheme is that the dynamic range of the system is also improved. For a real audio signal, after dividing the signal into different frequency bands, the signal amplitude variation within each frequency sub-band will be much smaller than that of the original signal. Thus, each frequency sub-band's signal dynamic range is much smaller and thus can be more easily handled by circuit.

To further reduce the THD among multiple frequency components, a relatively strong carrier wave should be transmitted to air. This is because that the desired frequency signal is generated between the interaction of the carrier signal and anyone of the AM modulated frequency components, while the undesired harmonic is generated from the interaction of any pair of the AM modulation frequency components (except pairs which include the carrier signal). The situation is described in FIG. 3(*b*) using DSB AM as an example. One possible way to generate strong carrier signal is to use so-called combo array structure as proposed in [10] which can transmit a strong carrier signal using PZT transducer efficiently. As mentioned above, one rather subtle effect of the proposed dynamic aperture in the embodiment is that the carrier signal is always transmitted from the whole array aperture, and thus a relatively stronger carrier signal is always in the air, especially compared to the amplitude of the middle-to-high frequency band signals, which are only produced using sub-arrays I and II in FIGS. 5(*a*) and 5(*b*). Thus, the effective modulating index is low for middle-to-high frequency band signals. As for low frequency band signals, the embodiment uses a lower AM index m to reduce the THD. Note that this reduces the reproducing efficiency for the low frequency signal.

In summary, the embodiment can achieve an optimal compromise among such important factors as signal fidelity, power-efficiency, system complexity, cost, etc. Specifically:

(1) Instead of using a single kind of modulation scheme as in past designs, this embodiment combines different modulation schemes for different frequency bands to efficiently reduce the THD.

(2) By increasing the aperture size of the transducer array toward low frequency, the SPL of low frequency signal will be increased. This can compensate the SPL fall towards the low frequency end predicted by theory. Thus the reproduced signal will have relatively uniform response and its bandwidth will be increased.

(3) By further using a frequency equalizer for each sub-band, the reproduced audible signal's frequency response will become more uniform.

(4) The THD is further reduced by using a small AM index for the low frequency components.

(5) By separating the real signal into different sub-bands, within each sub-band, the signal's amplitude variation is usually decreased. Thus the signal's dynamic range is reduced for each branch of the circuit implementation.

Many variations are possible within the scope of the invention. For example, although the embodiment of FIG. 2 conveniently uses the same frequency sub-bands both for different modulations and for dynamic aperture variation, the invention is not limited in this respect.

Furthermore, any one of the various novel techniques described above may used on its own, or combined with one or more of the others. Furthermore, the transducer array can either be a PZT or PVDF array, or even an array which combines the two.

REFERENCES

[1]. Tsuneo Tanaka, Mikio Iwasa, Youichi Kimura and Akira Nakamura "Directional Loudspeaker System" U.S. Pat. No. 4,823,908, 1989

[2]. A. R. Selfridge and P. Khuri-Yakub "Piezoelectric Film Sonic Emitter" U.S. Pat. No. 6,011,855, 2000

[3]. Masahide Yoneyama etc. "The Audio Spotlight: An Application of Nonlinear Interaction of Sound Wave to a New Type of Loudspeaker Design" J. Acoust. Soc. Am. 73(5), May 1983

[4]. F. Joseph Pompei "The Use of Airborne Ultrasonic for Generating Audible Sound Beams" J. Audio Eng. Soc., Vol. 47, No. 9, 1999, September

[5]. Mark F. Hamilton "Sound Beams" Nonlinear Acoustics, Edited by Mark F. Hamilton and Malcolm J. Crocker, Chapter 8, pp 233~pp 261, Academic Press, 1998.

[6]. Tomoo Kamakura, Tasahide Yoneyama and Kazuo Ikegaya "Studies for the Realization of Parametric Loudspeaker" J. Acoust. Soc. Japan, No. 6 Vol. 41, 1985.

[7]. K. Aoki, T. Kamakura and Y. Kamamoto "Parametric Loudspeaker—Applied Examples" Electronics and Communications in Japan, Part-A, Vol. 76, No. 8, 1993

[8]. Michael E. Spencer, James J. III Croft, Joseph O. Norris and Seenu Reddi "Modulator Processing for A Parametric Speaker System", WO 01/15491 A1, March, 2001

[9]. James J. Croft III, Michael E. Spencer and Joseph O. Norris "Modulator Processing for A Parametric Speaker System", U.S. Pat. No. 6,548,205, June, 2003

[10]. Xiaobing Sun and Kanzo Okada "Method and Apparatus for Generating A Directional Audio Signal" Singapore Patent Application No. 200202668-0, May, 2002

The invention claimed is:

1. A system for generating a modulated ultrasonic beam based on an input audio signal, the system comprising:

a modulation unit comprising:

(i) a filter section for dividing the input audio signal into a plurality of frequency bands;

(ii) an oscillator for generating an ultrasonic signal; and (iii) a modulation section which modulates the ultrasonic signal using the plurality of frequency bands, the plurality of frequency bands being modulated onto the ultrasonic signal according to different modulation schemes; and an ultrasonic transducer for generating and transmitting an ultrasonic beam from the modulated ultrasonic signal, whereby air demodulation of the ultrasonic beam generates audio signals, wherein different transducer aperture sizes are used for ultrasonic signals derived from different frequency ranges of the input audio signal.

2. A system according to claim 1 in which the modulation schemes comprise one or more of:

(a) double side band amplitude modulation without a square root operation;

(b) double side band amplitude modulation with a square root operation; and (c) single side band amplitude modulation.

3. A system according to claim 2 in which there are three frequency bands, (a) the lowest frequency band being modulated onto the ultrasonic signal using double side band amplitude modulation without a square root operation;

(b) the middle frequency band being modulated onto the ultrasonic signal using double side band amplitude modulation with a square root operation; and (c) the high frequency band being modulated onto the ultrasonic signal using single side band amplitude modulation.

4. A system according to claim 1 in which the ultrasonic transducer includes a plurality of sections having different signal transmission diameters, and inputs for receiving signals to be transmitted using the respective sections, the sections of different signal transmission diameters being arranged to receive inputs generated using different ones of the frequency bands.

5. A system according to claim 4 in which the transducer section of maximal signal transmission diameter is arranged to receive an input generated by modulating the ultrasonic signal with the lowest frequency band.

6. A system according to claim 5 in which an ultrasonic signal obtained using the lowest frequency band is transmitted to all of the transducer sections, and the other frequency bands are used only to generate inputs for one or more of the other transducer sections.

7. A system according to claim 4 in which the number of transducer sections is equal to the number of frequency bands.

8. A system according to claim 6 in which said modulating section modulates the ultrasonic signal using said lowest frequency band with a first modulating index, and modulates the ultrasonic signal using at least one other said frequency band with a second modulating index, the first modulating index being lower than the second modulating index.

9. A system according to claim 1 further including a frequency equalization section which multiplies the amplitudes of the frequency components within one of the bands by respective weighting factors, the weighting factors being selected to equalize the amplitudes of the frequency components of the band in the demodulated beam.

10. A system according to claim 9 including a frequency equalization unit for each said frequency band.

11. A system for generating a modulated ultrasonic beam based on an input audio signal, the system comprising:

a modulation unit arranged to receive the input audio signal and comprising:

(i) a filter section for dividing the input audio signal into a plurality of frequency bands;

(ii) an oscillator for generating an ultrasonic signal; and (iii) a modulation section which modulates the ultrasonic signal using the output of the filter section to produce a plurality of modulated ultrasonic signals, wherein the plurality of frequency bands are modulated onto the ultrasonic signal according to different modulation schemes; and an ultrasonic transducer for generating and transmitting an ultrasonic beam from the modulated ultrasonic signals, whereby air demodulation of the ultrasonic beam generates audio signals;

the ultrasonic transducer including a plurality of sections having different signal transmission diameters and inputs for receiving signals to be transmitted using the respective sections, the sections of different signal transmission diameters being arranged to receive modulated ultrasonic signals obtained using different respective subsets of the frequency bands.

12. A system according to claim 11 in which the transducer section of maximal diameter is arranged to receive an ultrasonic signal obtained by modulating the ultrasonic signal using the lowest frequency band.

13. A system according to claim 12 in which the lowest frequency band is used to produce modulated ultrasonic signals transmitted to all of the transducer sections, and signals for the other frequency bands are transmitted only to a subset of the transducer sections.

14. A system according to claim 11 in which said modulating section modulates the ultrasonic signal using the low frequency band with a first modulating index, and modulates the ultrasonic signal using at least one other frequency band with a second modulating index, the first modulating index being lower than the second modulating index.

15. A system according to claim 11 in which the number of transducer sections is equal to the number of frequency bands.

16. A system for generating a modulated ultrasonic beam based on an input audio signal, the system comprising:

a modulation unit comprising:

(i) a filter section for dividing the input audio signal into a plurality of frequency bands;

(ii) an oscillator for generating an ultrasonic signal;

(iii) a frequency equalization section which, for each band, multiplies the amplitudes of the frequency components by respective weighting factors; and (iv) a modulation section which modulates an ultrasonic signal using the plurality of frequency bands to produce a plurality of modulated ultrasonic signals, wherein the plurality of frequency bands are modulated onto the ultrasonic signal according to different modulation schemes; and an ultrasonic transducer for generating and transmitting an ultrasonic beam from the modulated ultrasonic signals, whereby air demodulation of the ultrasonic beam generates audio signals;

wherein different transducer aperture sizes are used for ultrasonic signals derived from different frequency ranges of the input audio signal, wherein the weighting factors are selected to equalize the amplitudes of the frequency components of the band in the demodulated beam.

17. A modulation unit for a system according to claim 16.

18. An ultrasonic transducer for a system according to claim 4, the transducer including:

a plurality of nested arrays of piezoelectric elements, the arrays having different respective maximum diameters, and for each array, a respective input for receiving a respective modulated ultrasonic signal for driving the elements of that array.

* * * * *